July 31, 1962 R. H. RUNK ET AL Re. 25,213
HEAT RESISTANT ELECTRICAL INSULATING VARNISH
Original Filed May 7, 1958
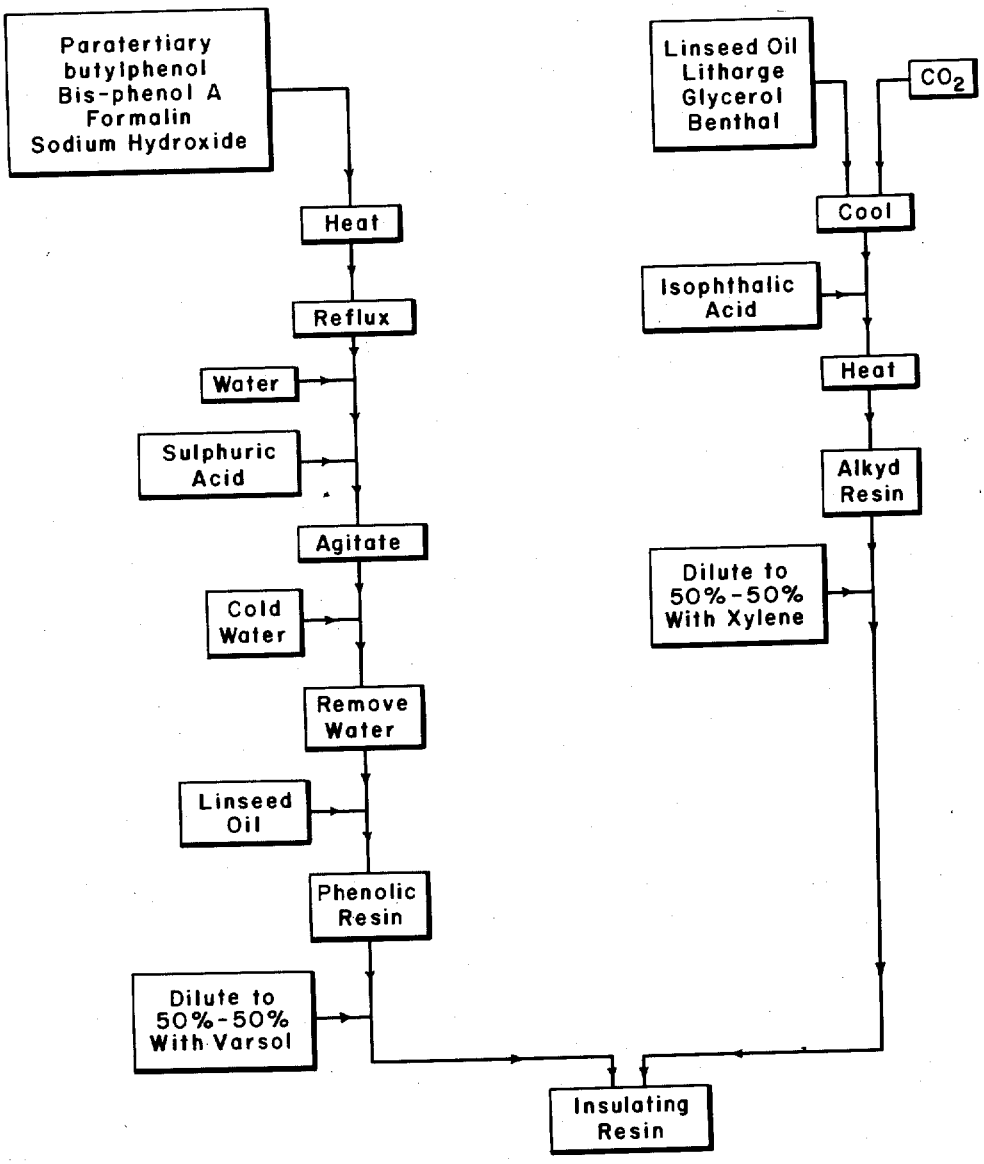
WITNESSES
John E. Hearley Jr.
Charles L. Menzemer
INVENTORS
Robert H. Runk &
Leonard E. Edelman
BY
Frederick Shapoe
ATTORNEY United States Patent Office Re. 25,213
Reissued July 31, 1962

25,213

HEAT RESISTANT ELECTRICAL INSULATING VARNISH

Robert H. Runk and Leonard E. Edelman, Pittsburgh, Pa., assignors to Westinghouse Electric Corporation, East Pittsburgh, Pa., a corporation of Pennsylvania Original No. 2,977,333, dated Mar. 28, 1961, Ser. No. 733,697, May 7, 1958. Application for reissue Aug. 31, 1961, Ser. No. 136,979
3 Claims. (Cl. 260—20)

Matter enclosed in heavy brackets [ ] appears in the original patent but forms no part of this reissue specification; matter printed in italics indicates the additions made by reissue.

This invention relates to the preparation of a heat resistant electrical insulating varnish and more particularly to an alkyd-phenolic resin heat resistant electrical insulating varnish.

Alkyd resin and phenolic resin mixtures have been used heretofore in the electrical industry as electrical insulating materials. Generally, the alkyd resin component has been made by reacting phthalic anhydride, glycerol, and linseed oil. The alkyd resin so prepared is satisfactory when combined with a phenolic resin to form an electrical insulation material for operation in a temperature range below 105° C. However, when machinery is operated at a higher temperature, for instance 130° C., this insulation begins to deteriorate rapidly.

The object of this invention is to provide an alkyd-phenolic resin varnish suitable for use as electrical insulation at temperatures above 105° C.

Another object of this invention is to provide an alkyd-phenolic-silicone resin varnish suitable for use as electrical insulation at temperatures above 105° C.

Still another object of the present invention is to provide electrical insulation suitable for use on machinery operating consistently above 130° C., comprised of an admixture of a medium oil length linseed modified glycerol isophthalate alkyd resin and a short oil length varnish vehicle consisting of a heat reactive oil soluble phenolic resin coreacted with maleinized linseed oil.

Other objects of the invention will, in part, be obvious and will, in part, appear hereinafter.

For a more complete understanding of the invention reference is made to the following description taken in conjunction with the accompanying drawing, the single figure of which is a schematic view in diagrammatic form illustrating one convenient method for preparing the alkyd-phenolic electrical insulation of this invention.

In accordance with the present invention and in the attainment of the foregoing objects there is provided, broadly, a high temperature electrical insulating varnish composition comprising in admixture (A) from 25% to 75% by weight of an alkyd resin and (B) from 75% to 25% by weight of a particular phenolic resin.

The alkyd resin (A) is derived by admixing and heating to a temperature within the range of 200° C. to 240° C. (1) at least one dibasic acid selected from the group consisting of isophthalic and terephthalic acid with (2) an aliphatic polyhydric alcohol and (3) a drying oil. The reactants are employed in such proportions that the drying oil constitutes from 40% to 55% by weight of the total weight of alkyd resin. The reactants are heated until the resin has an acid number in the range of from 4 to 15.

The phenolic resin (B) is derived by admixing and heating to a temperature within the range of 70° C. to reflux (1) from 90 to 80 mol percent of paratertiary butyl phenol and (2) from 10 to 20 mol percent of diphenylol-propane with (3) from 1.5 to 2 mols of an aldehyde selected from the group consisting of aqueous formaldehyde and polymers of formaldehyde in the presence of from 0.2% to 5%, based on the weight of the phenols, of an alkaline catalyst such as alkali metal hydroxide. The reaction product then is rendered acidic with an acid to a pH of between 4 and 7. Water then is removed from the acidified reaction product by evaporation. The product then is maintained at a temperature in the range of 135° C. to 140° C. until it has a ball and ring softening temperature of 100° C. after which maleinized linseed oil is added in such proportion that there is 12 gallons to 25 gallons of maleinized linseed oil to 100 pounds of phenolic resin reaction product.

More specifically in preparing the alkyd resin (A) predetermined quantities of a suitable (1) drying oil, (2) an aliphatic polyhydric alcohol, (3) a monobasic acid and (4) a catalyst are charged into a suitable reacion vessel and heated to 240° C. in an inert atmosphere, for example, carbon dioxide for a period of time sufficient to insure a substantially complete reaction.

Suitable drying oils include linseed oil, raw linseed oil, tung oil, oiticica oil, mixtures of the aforesaid oils and the like. To achieve the necessary flexibility, cure time, and viscosity, and since the resultant varnish will be cured by baking rather than air drying, it is critical that the resultant resin have a medium oil length. Therefore, the percent of drying oil in the resin should comprise 40% to 55% by weight of the total weight of resin.

A suitable aliphatic polyhydric alcohol is any alcohol containing more than one hydroxy group, for example, glycerol, propylene glycol, trimethylene glycol, tetramethylene glycol, ethylene glycol and the like and mixtures of two or more such polyhydric alcohols.

The purpose for employing monocarboxylic acid is that it yields one hydrogen ion per molecule in solution, which ion will react with free hydroxyl ions and thereby prevent premature gelation in the kettle during esterification. Examples of suitable monocarboxylic acids include aromatic acids such as benzoic acid and phenylacetic acid, and aliphatic acids such as, formic acid, acetic acid, propionic acid, and caproic acid.

A suitable catalyst is any compound capable of promoting esterification between the alcohol and the acid, for example, litharge, calcium oxide, sodium ethylate and lithium ricinoleate.

The esterification reaction is carried out in the presence of an inert gas such as carbon dioxide to prevent oxygen, which would be present in a normal atmosphere, from reacting with the drying oil component, which reaction would result in premature gelation in the reaction vessel.

After the esterification has been carried substantially to completion, the mixture is cooled while being sparged with an inert gas, for example, carbon dioxide, and a predetermined quantity of at least one dibasic acid is added, the acid being selected from the group consisting of isophthalic acid and terephthalic acid.

The cooling of the mixture before adding the dibasic acid is not considered critical to the reaction but is a precautionary measure to prevent flashing.

The mixture comprising the initial reaction product and the dibasic acid is then heated slowly to a temperature of about 240° C. which temperature is maintained until the resultant mixture has an acid number in the range of from 4 to 15, preferably from 8 to 10. A higher acid number may result in the mixture having a corrosive effect on metals with which it might come in contact. A lower acid number would prevent a complete reaction with the phenolic resin with which the above described alkyd resin is mixed in accordance with this invention.

The above described alkyd resin is mixed with a suitable organic solvent, either aromatic or aliphatic, or mixtures thereof for example, mineral spirits, naphtha, xylene, toluene, benzene, and the like, the resultant mixture being 50% by weight solids.

In preparing the phenolic resin (B), predetermined quantities of a mixture of phenols composed of from 90 to 80 mol percent of paratertiarybutyl phenol and from 10 to 20 mol percent of diphenylolpropane, and from 1.5 to 2 mols of an aldehyde, per mol of combined phenol are admixed. The aldehyde is selected from the group consisting of aqueous formaldehyde and polymers of formaldehyde. An alkali metal hydroxide catalyst, for example, sodium or potassium hydroxide, then is added and the mixture is heated to a temperature between 70° C. and reflux with agitation for a period of time sufficient to insure substantially complete reaction. There is a substantial amount of water present in the reaction product.

The reaction time is dependent upon two factors, viz., the amount of heat applied and the amount of catalyst present. The quantity of catalyst present may vary from 0.2% to 5% based upon the weight of the phenols. A reaction time of about 3 hours is required with a minimum amount of catalyst and a temperature of about 70° C. The reaction may be completed in about 1 hour by heating to reflux and using at least ½% by weight of the catalyst based on the weight of the phenols.

The reaction product is treated with an acid to reduce the pH of the reaction product to a range of from 4 to 7. Examples of suitable acids for this purpose are oxalic acid, phthalic anhydride, hydrochloric acid, sulfuric acid and phosphoric acid. The acidification is critical since without acidification the reaction product subsequently obtained is unsuitable for admixing with an oil.

After acidification, the reaction product is agitated for about 15 minutes after which it is allowed to stand whereupon an aqueous layer separates out and is withdrawn.

The resinous layer remaining is subjected to vacuum distillation to an absolute pressure of between 1 mm. and about 50 mm. Hg, to remove the water present. The resinous residue is heated during the vacuum distillation until a temperature of from 100° C. to 130° C. is reached. Then the vacuum is broken and, at atmospheric pressure, the temperature is gradually increased to 135° C. to 140° C. and maintained there for a period of time sufficient to produce a resinous product which, when cooled, is hard and brittle and has a softening point of from 75° C. to 105° C. by the ball and ring method.

The resinous product is then mixed with a quantity of maleinized linseed oil in such proportions that the resulting mixture contains 12 to 25 gallons of the maleinized linseed oil per 100 pounds of the resin. The resin may therefore be said to have a short oil length.

The above described oil modified phenolic resin is mixed with a suitable organic hydrocarbon solvent, for example, a petroleum solvent such as naphtha, or an aromatic solvent such as xylol, the resultant mixture being 50% by weight resin and 50% by weight solvent.

The maleinized linseed oil may be prepared by reacting 100 parts by weight of linseed oil with from 3 to 8 parts by weight of maleic anhydride at a temperature of from 240° C. to 270° C. for not more than four hours until an adduct is produced. Then a polyhydric alcohol is added in an amount to provide from 1 to 1.1 hydroxyl groups per mol of maleic anhydride present in the adduct. The polyhydric alcohol should have no other reactive groups than the hydroxyl groups. Suitable examples are glycerol, ethylene glycol, diethylene glycol, pentaerythritol and 1,3 propylene glycol. The mixture with the added polyhydric alcohol is heated at temperatures of from 200° C. to 270° C. for a few hours to esterify the carboxyl groups of the linseed-maleate adduct.

An acid number of from 5 to 12 and a viscosity of from W to Y on the Gardner-Holdt scale is suitable for the glycerol based maleinized linseed oil.

The alkyd resin (A) solution and phenolic resin (B) solution prepared as described above then are combined to form an electrical insulating varnish suitable for use on equipment operating at temperatures of 105° C. and above for sustained periods of time. The two resins may be combined in the range of 25% to 75% by weight alkyd resin and 75% to 25% by weight phenolic resin. The particular compositon selected for use is dependent, of course, upon the equipment to be insulated. The alkyd resin imparts flexibility and heat resistance to the composition and the phenolic resin imparts thermosetting properties and stability. Therefore, if the varnish is to be used on high speed rotors the composition should be comprised of a majority of phenolic resin. On the other hand if it is to be used on stationary equipment or equipment that will be operated at extremely high temperatures the compositoin should be composed primarily of alkyd resin.

In a modification of this invention, from 0.25% to 0.5% by weight of a dimethyl siloxane resin may be added to the alkyd-phenolic resin mixture to provide improved heat stability. The addition of the siloxane resin has proven most satisfactory when it is desired to coat glass cloth and similar materials with the insulating varnish.

The most satisfactory results have been obtained by utilizing an alkyd modified dimethyl siloxane resin having a phenyl to methyl ratio in the range of 0.6 to 1.2.

The upper range of siloxane resin content is considered critical, since when over 0.5% by weight of siloxane resin is present difficulty is experienced in causing the resin mixture to gel.

The following examples are illustrative of the practice of this invention. All quantities are by weight unless otherwise specified.

EXAMPLE I

About 520 parts of linseed oil (alkali refined), 167 parts of glycerol (98%), 68 parts of benthal (85% benzoic acid and 15% phthalic acid) and 0.5 part of litharge are charged into a closed reaction vessel equipped with an agitator, thermometer, and inert gas sparging tube. A carbon dioxide atmosphere is established in the flask. The mixture is heated to a temperature of 240° C. and this temperature is maintained for about one hour while the mixture is being agitated. The mixture then is cooled to about 200° C. while being sparged wtih carbon dioxide and about 352 grams of isophthalic acid (98%) is added.

The resultant mixture is then heated slowly to a temperature of about 240° C. and this temperature is maintained until the resultant mixture has an acid number of about 9.

The mixture is then cooled to approximately 200° C., and mixed with xylene to form a solution comprised of 50% by weight solids and having a viscosity of F to G on the Gardner-Holdt scale.

Satisfactory results also can be achieved by substituting terephthalic acid and mixtures of isophthalic and terephthalic acid for the isophthalic acid employed in Example I.

Satisfactory results also can be achieved by substituting raw linseed oil, safflower oil, tung oil, oiticica oil and mixtures of these oils for linseed oil in Example I.

Equally satisfactory results also are obtainable by substituting trimethylol ethane, trimethylol propane or other trihydroxy alcohol for glycerol in Example I.

Satisfactory results can be obtained by substituting calcium oxide, sodium ethylate, lithium ricinoleate for litharge in Example I.

Satisfactory results can be obtained by substituting benzoic acid, phenylacetic acid, and monocarboxylic acids for benthal in Example I.

Satisfactory results can be obtained by varying the drying oil content in Example I, the only requirement being that the oil comprise 40% to 55% by weight of the resultant resin.

EXAMPLE II

Into a closed reaction vessel provided with a reflux column and an agitator there is introduced the following:

| | Parts |
|---|---|
| Paratertiary butyl phenol | 266.3 |
| Bis-phenol A | 57.8 |
| Formalin (37%) | 258 |
| Sodium hydroxide | 1.3 |

The reaction vessel is heated until refluxing started at atmospheric pressure, and heating under reflux is continued for about 1.5 hours. The resulting condensation product is cooled to about 80° C. and 2.8 parts of sulfuric acid (35%) are added to reduce the pH of the mixture to about 5. The mixture is agitated for approximately 15 minutes more, and then the composition is allowed to stand to permit separation of a resinuous layer from an aqueous layer. The aqueous layer is removed and the resinous layer is subjected to vacuum distillation to remove substantially all the water therefrom. The vacuum distillation was continued until a temperature of 130° C. for the mass [ws] *was* reached at a pressure of about 20 mm. of mercury.

Thereafter, the vacuum is broken and further polymerization of the resin is carried out under atmospheric pressure and a temperature of between 130° C. and 140° C. until a softening point of approximately 100° C. is obtained by the ball and ring method.

Approximately 510 parts of maleinized linseed oil are added and the mixture held at 150° C. to a two-inch hot string.

The mixture is then mixed with xylol so that the resulting mixture is comprised of 50% solids.

Satisfactory results can be achieved by substituting paratertiary butyl phenol for the paratertiary butyl phenol plus bis-phenol A of Example II.

Satisfactory results can be achieved by substituting potassium hydroxide for sodium hydroxide in Example II.

Satisfactory results can be achieved by varying the amount of maleinized oil added as long as the amount added is in the range of 12 to 25 gallons of oil per 100 pounds [or] *of* resin.

EXAMPLE III

Equal parts of the 50% solutions of Example I and Example II were thoroughly mixed to form an electrical insulating varnish. Physical and electrical tests disclosed the following properties:

| | |
|---|---|
| Viscosity, Demmler #1, seconds, at 25° C. | 112 |
| Specific gravity at 25° C. | 0.946 |
| Percent solids | 49.6 |
| ASTM drying time at 135° C. minutes | 15 |
| Gel time at 135° C. do | 35 |
| Durometer hardness, 6-hour cake at 135° C. | 30–5 |
| Oil Cake after 24-hours at 110° C. in oil | 60–50 |
| ASTM oil proofness | Passes |
| Dielectric strength, VPM: | |
| Dry | 3,050 |
| Wet | 2,350 |
| ASTM flex life at 110° (no failure) hours | 3,300 |
| ASTM flex life at 150° C. do | 264 |

EXAMPLE IV

Three-tenths of one percent by weight of a cold blending siloxane resin having a phenyl to methyl ratio in the range of 0.6 to 1.2 was added to the high temperature electrical insulating varnish of Eaxmple III.

EXAMPLE V

Seventh-tenths of one percent by weight of the siloxane resin of Example IV was added to the high temperature electrical varnish of Example III. It was impossible to gel the resulting mixture.

Since certain changes in carrying out the above processes and in the product embodying the invention may be made without departing from its scope, it is intended that the accompanying description and drawing be interpreted as illustrative and not limiting.

We claim as our invention:

1. A high temperature electrical insulating varnish composition comprising in admixture (A) from 25% to 75% by weight of an alkyd resin derived by admixing and heating to a temperature in the range of 200° C. to 240° C. (1) at least one dibasic acid selected from the group consisting of isophthalic acid, terephthalic acid, and methyl esters of terephthalic acid, with (2) an aliphatic polyhydric alcohol and (3) a drying oil, said reactants being employed in such proportions that the drying oil constitutes 40% to 55% by weight of the total weight of alkyd resin, and said alkyd resin being reacted to an acid number in the range of 4 to 15 and [(b)] (*B*) from 75% to 25% by weight of a phenol resin derived by admixing and heating to a temperature within the range of 70° C. to reflux (1) from 90 to 80 mol percent of paratertiary butyl phenol, (2) from 10 to 20 mol percent of diphenylol propane, and (3) from 1.5 to 2 mols of an aldehyde selected from the group consisting of formaldehyde and polymers of formaldehyde in the presence of from 0.2% to 5% based on the weight of the phenols, of an alkali metal hydroxide, the aqueous reaction product then being neutralized and rendered acidic with an acid to a pH in the range of 4 to 7, removing the water from the acidified reaction product by evacuation, heating and maintaining the product at a temperature of 135° C. to 140° C. until a ball and ring softening temperature of 100° C. is obtained, and then admixing maleinized linseed oil therwith in such proportion that there is [25 gallons to 40 gallons] *12 gallons to 25 gallons* of maleinized linseed oil per 100 pounds of reaction product, said maleinized linseed oil being the reaction product of 100 parts of linseed oil and from 3 to 8 parts of maleic anhydride at a temperature of from 240° C. to 270° C. for not more than 4 hours until an adduct is produced, after which an aliphatic polyhydric alcohol is admixed in an amount to furnish from 1 to 1.1 hydroxyl groups for each maleic anhydride molecule present in the adduct, the polyhydric alcohol having no other reactive groups than the hydroxyl groups, and an esterifying reaction between the polyhydric alcohol and the maleic anhydride radicals in the adduct is effected by heating the mixture at a temperature up to 270° C. for at least one hour.

2. A high temperature electrical insulating varnish composition comprising in admixture (A) from 25% to 75% by weight of an alkyd resin derived by admixing and heating to a temperature within the range of 200° C. to 240° C. (1) at least one dibasic acid selected from the group consisting of isophthalic acid and terephthalic acid and methyl esters of terephthalic acid with (2) an aliphatic polyhydric alcohol, (3) a monobasic acid, and (4) a drying oil, said reactants being employed in such proportions that the drying oil constitutes 40% to 55% by weight of the total weight of the alkyd resin, and said alkyd resin having been reacted to an acid number in the range of 4 to 15 and (B) from 75% to 25% by weight of a phenol resin derived by admixing and heating to a temperature within the range of 70° C. to reflux (1) from 90 to 80 mol percent of paratertiary butyl phenol, (2) from 10 to 20 mol percent of diphenylol propane, and (3) from 1.5 to 2 mols of an aldehyde selected from the group consisting of aldehydes and polymers of formaldehyde in the presence of (3) from 0.2% to 5%, based on the weight of the phenols, of an alkali metal hydroxide, the aqueous reaction product then being neutralized and rendered acidic with an acid to a pH in the range of 4 to 7 removing the water from the acidified reaction product by evacuation, heating and maintaining the product of a temperature in the range of 135° C. to 140° C. until a ball and ring softening temperature of 100° C. is obtained, and then admixing maleinized linseed oil in such proportion that there is [25 gallons to 40 gallons] *12 gallons to 25 gallons* of maleinized linseed oil per 100 pounds of reaction product, said maleinized linseed oil being the reaction product of 100 parts of linseed oil and from 3 to 8 parts of maleic anhydride at a temperature of from 240° C. to 270° C. for not more than 4 hours until and adduct is produced, after which an aliphatic polyhydric alcohol is admixed in an amount to furnish from 1 to 1.1 hydroxyl groups for each maleic anhydride molecule present in the adduct, the polyhydric alcohol having no other reactive groups than the hydroxyl groups, and an esterifying reaction between the polyhydric alcohol and the maleic anhydride radicals in the adduct is effected by heating the mixture at a temperature up to 270° C. for at least one hour.

3. A high temperature electrical insulating varnish composition comprising in admixture (A) from 25% to 75% by weight of an alkyd resin derived by admixing and heating to a temperature in the range of 200° C. to 240° C. (1) at least one dibasic acid selected from the group consisting of isophthalic acid, terephthalic acid, and methyl esters of terephthalic acid, with (2) an aliphatic polyhydric alcohol and (3) a drying oil, said reactants being employed in such proportions that the drying oil constitutes 40% to 55% by weight of the total weight of alkyd resin, and said alkyd resin having been reacted to an acid number in the range of 8 to 10 and (B) from 75% to 25% by weight of a phenol resin derived by admixing and heating to a temperature within the range of 70° C. to reflux (1) from 90 to 80 mol percent of paratertiary butyl phenol, (2) from 10 to 20 mol percent of diphenylol propane, and (3) from 1.5 to 2 mols of an aldehyde selected from the group consisting of aldehydes and polymers of formaldehyde in the presence of from 0.2% to 5% based on the weight of the phenols, of an alkali metal hydroxide, the aqueous reaction product then being neutralized and rendered acidic with an acid to a pH in the range of 4 to 7, removing the water from the acidified reaction product by evacuation, heating and maintaining the product to a temperature in the range of 135° C. to 140° C. until a ball and ring softening temperature of 100° C. is obtained, and then admixed maleinized linseed oil in such proportion that there is [25 gallons to 40 gallons] *12 gallons to 25 gallons* of maleinized linseed oil per 100 pounds of reaction product, said maleinized linseed oil being the reaction product of 100 parts of linseed oil and from 3 to 8 parts of maleic anhydride at a temperature of from 240° C. to 270° C. for not more than 4 hours until an adduct is produced, after which an aliphatic polyhydric alcohol is admixed in an amount to furnish from 1 to 1.1 hydroxyl groups for each maleic anhydride molecule present in the adduct, the polyhydric alcohol having no other reactive groups than the hydroxyl groups, and an esterfying reaction between the polyhydric alcohol and the maleic anhydride radicals in the adduct is effected by heating the mixture at a temperature up to 270° C. for at least one hour.

References Cited in the file of this patent or the original patent

UNITED STATES PATENTS

| | | |
|---|---|---|
| 2,046,318 | Brubaker | July 7, 1936 |
| 2,586,385 | Runk | Feb. 19, 1952 |
| 2,618,739 | Tess et al. | Nov. 18, 1952 |
| 2,686,739 | Kohl | Aug. 17, 1954 |
| 2,686,740 | Goodwin | Aug. 17, 1954 |
| 2,687,398 | McLean | Aug. 24, 1954 |